United States Patent [19]

Brown et al.

[11] Patent Number: 5,622,736
[45] Date of Patent: Apr. 22, 1997

[54] REMOVAL APPARATUS FOR REMOVING A MOLD SECTION FROM A MOLDED PART

[75] Inventors: Robert L. Brown, Hartville; Todd A. England, North Canton; Daniel L. Goodell, Tallmadge; David E. Baxter, deceased, late of Ravenna, all of Ohio, by Carol Baxter, Gregory L. Baxter, Jeffrey A. Baxter, Mark A. Baxter, Pamela K. (Baxter) Stone, Steven W. Baxter, heirs

[73] Assignee: GenCorp Inc., Fairlawn, Ohio

[21] Appl. No.: 283,123

[22] Filed: Jul. 29, 1994

Related U.S. Application Data

[63] Continuation-in-part of Ser. No. 146,846, Nov. 1, 1993, Pat. No. 5,449,282.

[51] Int. Cl.⁶ ................................. B29C 45/44
[52] U.S. Cl. .................. 425/556; 264/334; 425/444; 425/577
[58] Field of Search .................... 425/554, 556, 425/436 R, 438, 441, 443, 444, 436 RM, 577; 264/334

[56] References Cited

U.S. PATENT DOCUMENTS

2,799,049  7/1957  Wilson ........................... 425/438
3,247,548  4/1966  Fields et al. .................... 425/438
4,533,312  8/1985  Von Holdt ....................... 425/438

Primary Examiner—Tim Heitbrink
Attorney, Agent, or Firm—Robert F. Rywalski; Jeanne E. Longmuir

[57] ABSTRACT

An apparatus 10 for removing a mold section C from a molded part M. The apparatus 10 includes a base frame 11 supporting a driver 12 and a power supply, and a support member 16 for engagement with the molded part M. The driver 12 is engaged with and driven by the power supply M. The support member 16 has a clamping station for receiving and clamping the mold section C engaged with the molded part M. The clamping station 20 also has an open position for receiving the mold section C engaged with the molded part, and a closed position in which the mold section and molded part are clamped within the clamping station. The clamping station 20 further includes a heater 44, to assist with partial heating of the molded part M and mold section C prior to removal of the molded part. A removal station 22 for receiving the mold section C following removal from engagement with the molded part M is also provided, as is a force rod member 13 for engagement with the mold section, which is operated by the driver 12 for movement between the clamping and removal stations 20, 22 during removal of the mold section from the molded part.

10 Claims, 9 Drawing Sheets

REMOVAL APPARATUS FOR REMOVING A MOLD SECTION FROM A MOLDED PART

This is a continuation-in-part application of U.S. application Ser. No. 08/146,846 filed Nov. 1, 1993 now U.S. Pat. No. 5,449,282.

TECHNICAL FIELD

The present application relates to an apparatus for removing a mold portion used in connection with the manufacture of a molded part from engagement with the molded part.

BACKGROUND

In a typical molding process, the mold assembly is usually formed by joinable/separable mold portions. When an insert molding procedure is used in an injection molding machine, the mold portions are initially separated and an unfinished insert is loaded into one of the mold portions. The mold portions are then joined together to form the mold cavity. A mold component section, mold section or mold core is also often used which may form a component of the mold cavity, and which is removably engaged with the molded part once formed.

Once the mold cavity is formed, the mold assembly is clamped under the necessary force to hold the unfinished insert and mold core in position during operation of the injection assembly, which injects the molding material into the mold cavity. A portion of the mold assembly is then opened or removed and the molded product having the previously unfinished, now molded insert, is unloaded from the mold cavity with the mold core still engaged. At this point in the molding process, the mold core must be removed to complete the molded part, or before further processing of the molded part can be completed.

SUMMARY OF THE INVENTION

The present application provides a new and improved apparatus for removing the mold core portion from the molded part. The use of the claimed removal apparatus permits the rapid removal of the mold core from the molded part at a location remote from the molding apparatus. The use of a remote removal apparatus eliminates removal of the molded part from the mold core at the molding apparatus, which typically results in substantial periods of idleness of the molding apparatus.

Additionally, the present removal apparatus is provided with heater components to permit further curing of the molded part within the apparatus. Such post-cure heating within the removal apparatus also enables efficient heating of the mold core prior to the next injection molding cycle.

In the present apparatus, the molded part removed is a cylindrical metal tube member having a rubber material component molded on the internal diameter of the tube in a desired configuration. The mold core to be removed is a substantially solid cylindrical component which is secured within the tube member during the molding operation and forms a portion of an internal wall of the mold cavity within the tube member. However, it should be understood that the present apparatus may be used to remove a variety of components from molded products.

The removal apparatus for removing a mold component section from a molded part specifically includes a base frame supporting a driver and a power supply. The driver is engaged with and driven by the power supply. The driver further includes a support member for engagement with the molded part. The support member has an initial station, a clamping station for receiving and clamping the mold core engaged with the molded part, and a removal station for receiving the mold core following removal from engagement with the molded part. The clamping station portion of the support member includes a locking door which is pivotally engaged to permit movement of the locking door between an open position and a closed position. The locking door is secured in closed position by a lock engaged with the support member.

In the open position, the locking door of the support member is open to receive the mold core engaged with the molded part. Once engaged with the support member, the locking door is moved to the closed position and locked in the closed position, in which the mold core and molded part are clamped within the clamping station. The clamping station also includes heating elements to assist with partial curing of the molded part, and heating of the mold core prior to removal of the molded part.

The driver includes a piston force rod member for engagement with the mold core, which is operated by the driver for movement between the clamping and removal stations to remove the mold core from the molded part. The force rod member includes an engagement member positioned and secured to engage the mold core, and to move with the force rod member to remove the mold core from the molded part.

During operation of the apparatus to remove the mold core portion from the molded part, the engagement member is located in the initial station. Upon placement of a mold core and molded part within the support member in the closed position, the engagement member of the force rod member may then be moved by the driver to engage the mold core. The application of force by the driver and force rod member biases the mold core and engagement member from the clamping station to the removal station. In the illustrated embodiment, the molded part remains captured within the clamping station engaged with and biased against stop members of the support member. However, it should be understood that the element biased from the clamping station to the removal station may be either the molded part or the mold core.

Once either the molded part or mold core is moved from the clamping station to the removal station, the element is maintained within the removal station by the resistive members. Once within the removal station, the element may be removed for use in connection with further molding processes. Likewise, the locking door at the clamping station may than be unlocked and moved from the closed position to the open position, and the remaining element removed from the support member.

A control system is also provided for automatically or manually controlling operation of the apparatus.

Other features and advantages of the present apparatus will become apparent from the following detailed description of the preferred embodiment made with reference to the accompanying drawings, which form a part of the specification.

DETAILED DESCRIPTION OF THE PREFERRED EMBODIMENT

Figure 1A:
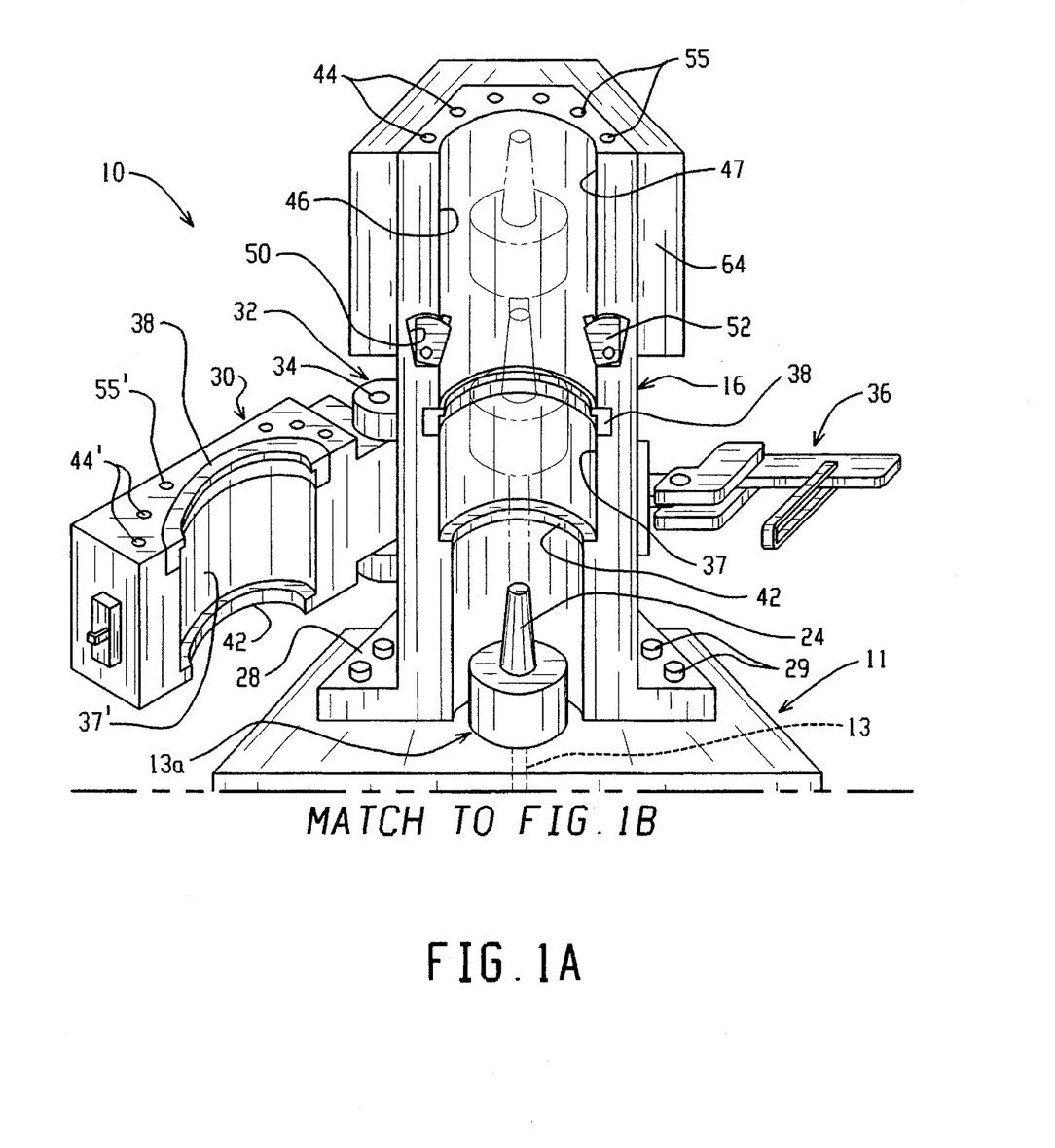
FIGS. 1A–1B are a schematic view of the removal apparatus, in an open position, constructed in accordance with the present apparatus.
Figure 1B:
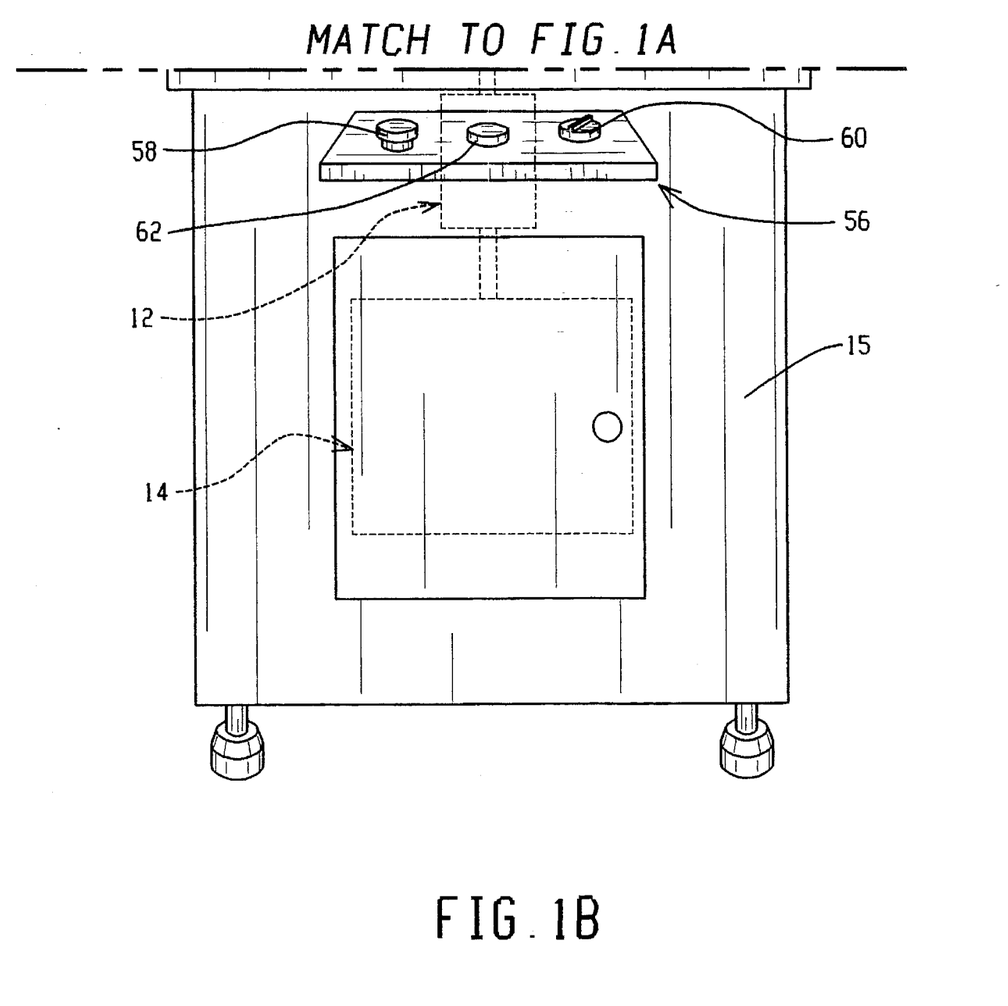
Figure 4:
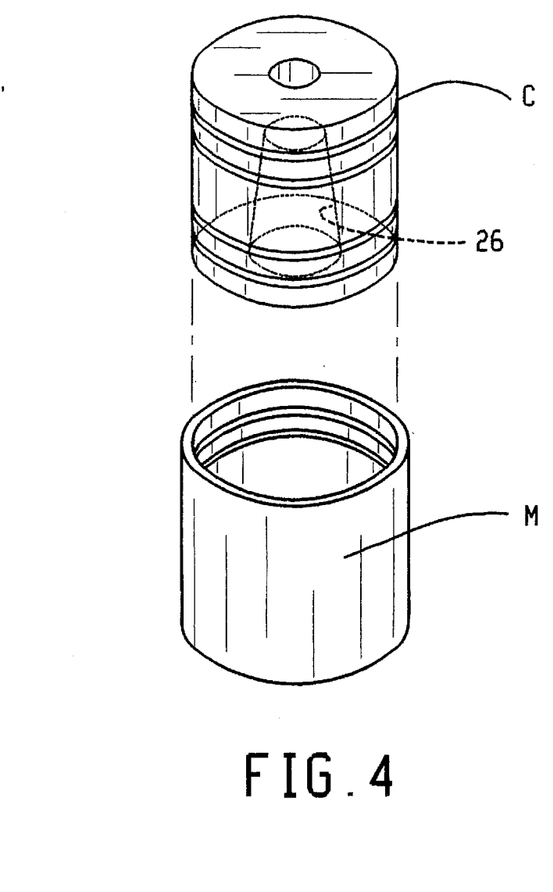
FIG. 4 shows a perspective view of the molded part and mold core portion following removal of the mold core portion from engagement within the molded part and the removal apparatus.

FIGS. 1A–1B illustrate an improved removal apparatus in an open position. The removal apparatus, generally referred to at reference numeral 10 in the illustrated embodiment, is preferably capable of removing a molded part M, which is a cylindrical tube-like member which may be manufactured of a variety of material. The cylindrical tube has a rubber material component molded on the internal diameter of the tube in a desired configuration, to form a seal in the illustrated component. The molded part M is illustrated in FIG. 4.

The molded part M in the illustrated embodiment is removed from the mold section or mold core C. The mold core C to be removed from engagement with the molded part M is a substantially solid cylindrical component. However, the present apparatus may be used to remove a variety of components from molded products.

During injection molding of the molded part, the mold core C is secured within the tube member during the molding operation and forms a portion of an internal wall of the mold cavity within the tube member. As shown in FIG. 4, the external diameter of the mold core C includes a desired pattern for molding the rubber material on the internal diameter of the molded part M.

The use of the removal apparatus of this application permits the rapid removal of the mold core from the molded part at a location remote from the molding apparatus. Such rapid removal at a remote location assists with reducing the amount of time the injection molding machine is idle due to removal of the mold core C. Additional time and machine savings are obtained by the use of heater components within the removal apparatus. By post-cure heating of the molded part, savings are obtained during further curing of the molded part. Also pre-heating of the mold core during and following removal of the molded part, provides efficient heating of the mold core before the next injection molding process is performed.

The illustrated removal apparatus includes a base frame 11 supporting a driver 12 and a power supply 14. The base frame includes a cabinet 15 for housing various elements, including the power supply 14 and supports a support member 16. The driver 12 of the preferred embodiment, for example, is a 1 ton screw jack manufactured by Nook Industries. The overall travel of the driver used is dependent on the specific part requirements, for example, in the illustrated embodiment a 5 inch travel is used. The driver 12 is engaged with and driven by the power supply 14. The power supply of the appartus is an electric motor which may be of various horse powers depending on the specific part requirements. In the illustrated embodiment, for example, the power supply is a 1½ horse power electric motor manufactured by Baldor Company. The driver 12 further includes a piston force rod member 13 having an engagement member 13a secured thereto, for mating engagement with a portion of the molded part M or mold core C. In the illustrated embodiment the engagement member 13a has a cone shaped extension 24 for mating engagement with a cone shaped opening 26 formed in the bottom surface of the mold core C.

The support member 16 has an initial station 18, a clamping station 20 for receiving and clamping the mold core C engaged with the molded part M, and a removal station 22 for receiving the mold core C following removal from engagement with the molded part M. As shown, the support member 16 includes a steel housing 17 which has a substantially C-shaped cross-sectional configuration. The support member 16 additionally includes a flange 28 which is used to secure the support member to the base frame 11 via conventional fasteners 29.

The clamping station 20 of the support member 16 includes a locking door 30 which is pivotally secured along an edge portion 32 of the support member at a pivot 34 to permit movement of the locking door. As shown in FIGS. 1A–1B, the locking door 30 is in an open position. As shown in FIGS. 3B–3E, the locking door is in a closed position. The locking door 30 is secured in closed position by a lock or clamp 36 engaged with the support member 16. In the illustrated and preferred embodiment, the lock 36 is a fixture, over-center type clamp manufactured by the De-Sta-Co company.

Figure 3A:
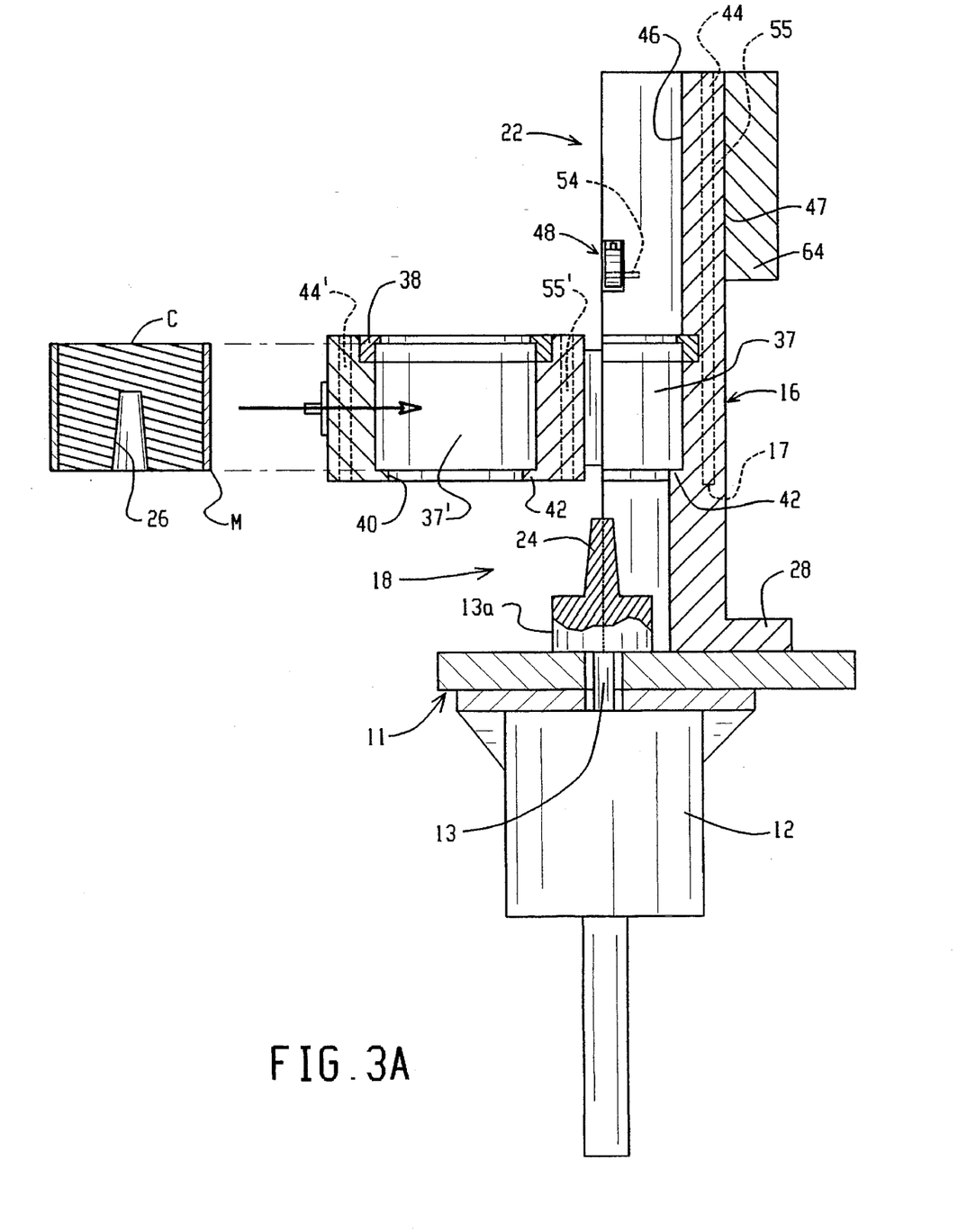
FIG. 3A is a schematic side view, partially cut-away, of the removal apparatus in an open position for receiving the illustrated molded part and the mold core portion engaged therewith.
Figure 3B:
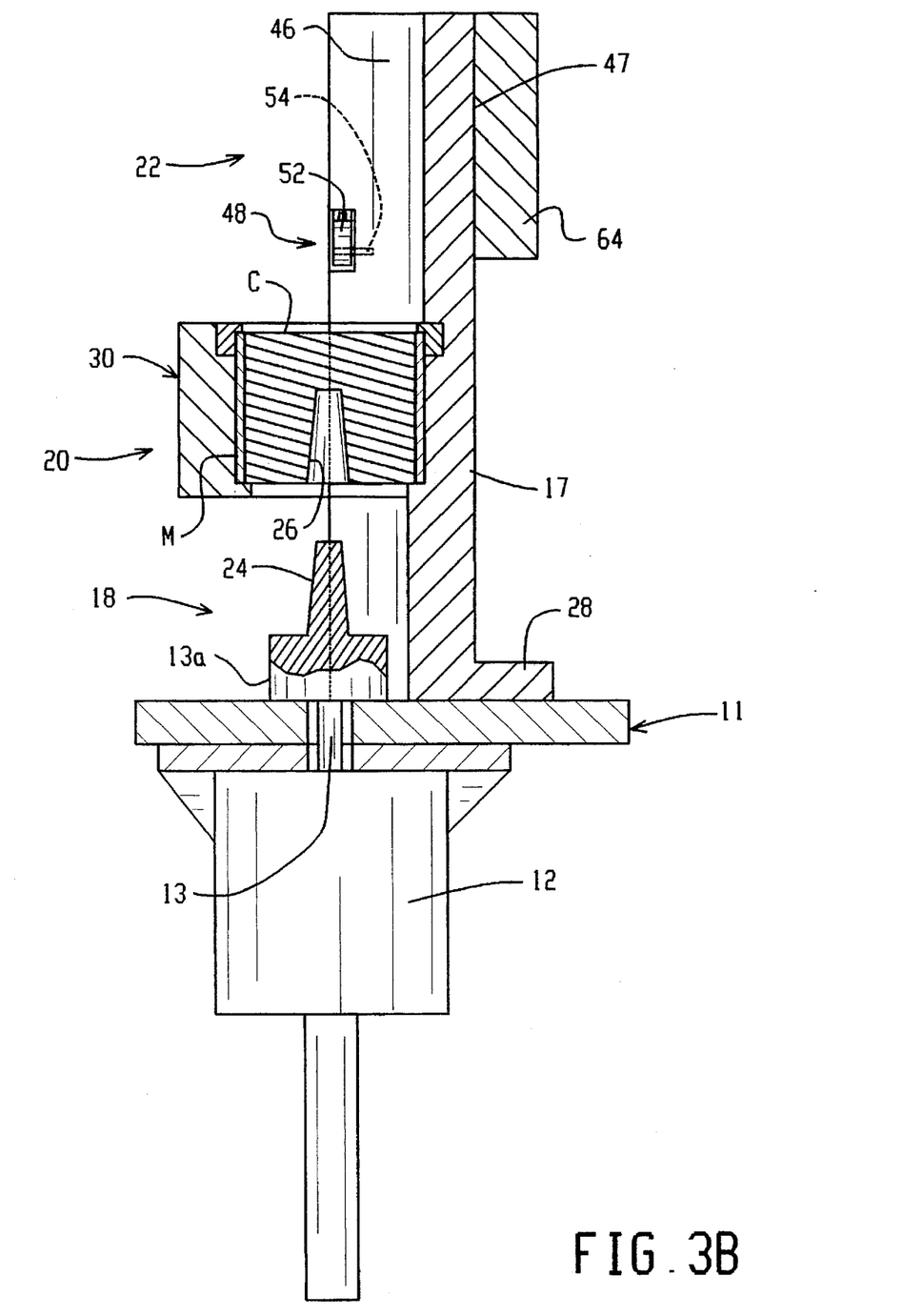
FIG. 3B is a schematic side view, partially cut-away, of the removal apparatus in a closed position with the molded part and the mold core portion engaged therewith.
Figure 3C:
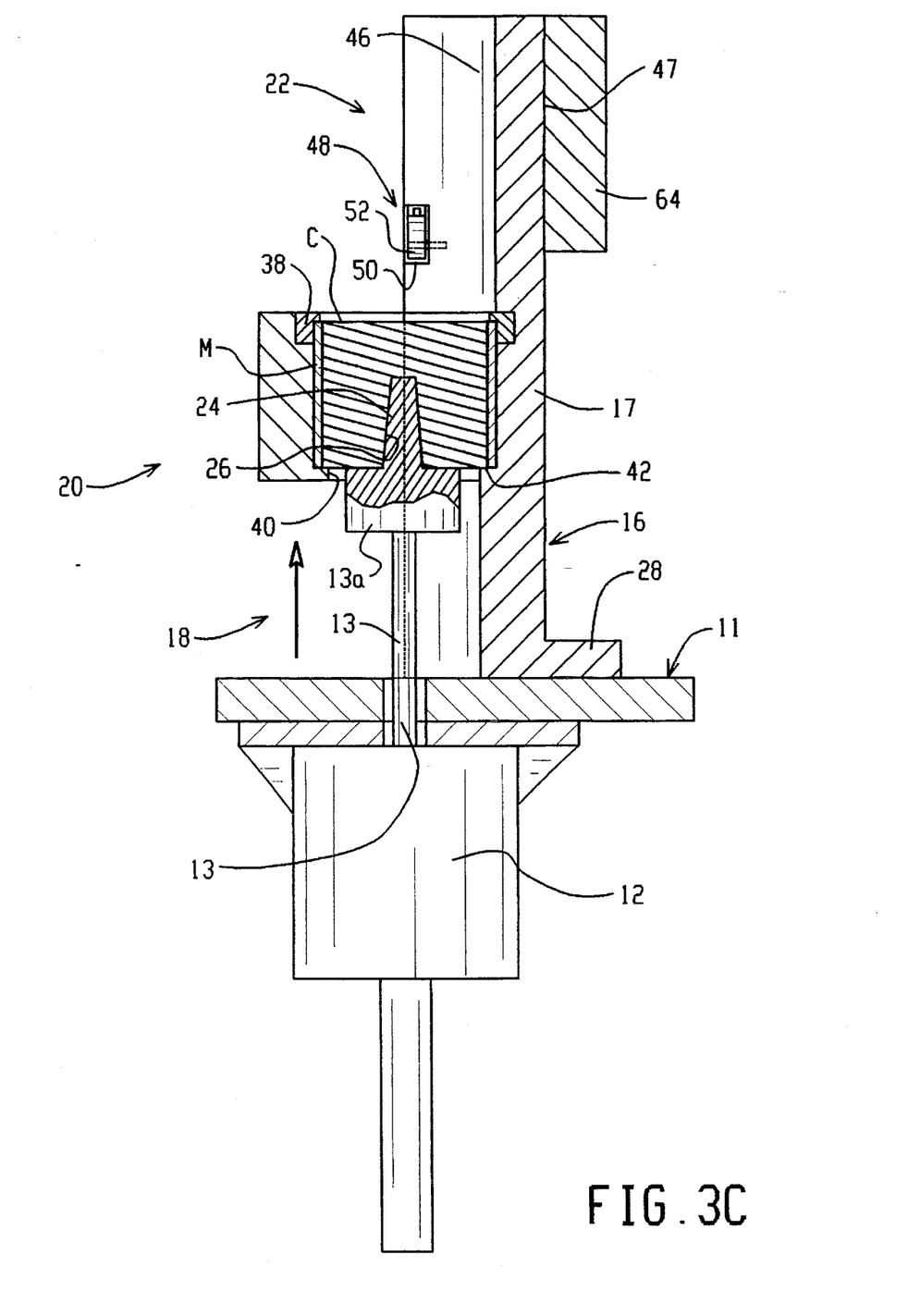
FIG. 3C is a schematic side view, partially cut-away, of the removal apparatus with the force rod member engaged with the mold core portion.
Figure 3D:
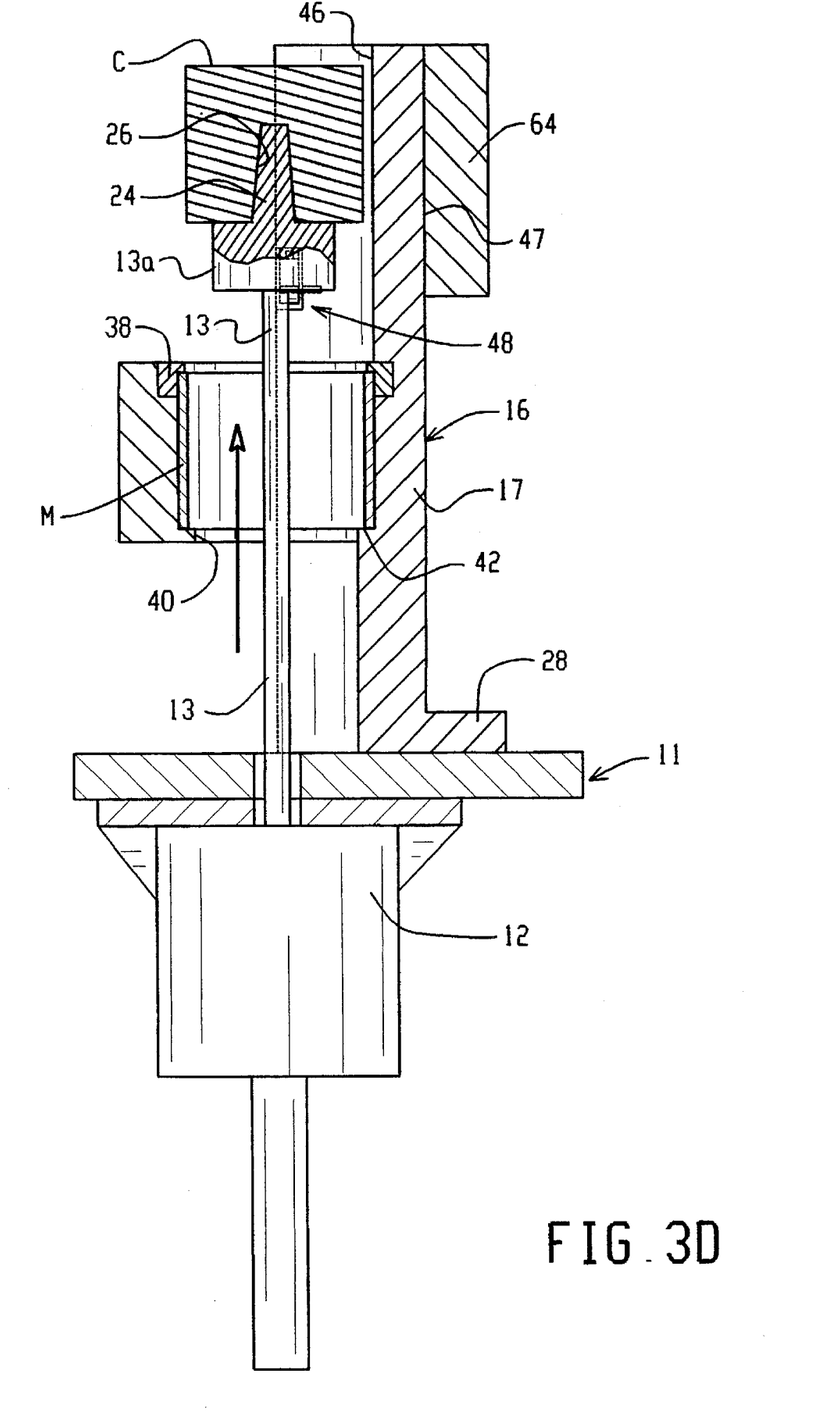
FIG. 3D is a schematic side view, partially cut-away, of the removal apparatus with the force rod member engaged with the mold core portion following removal from engagement with the molded part, which is illustrated within the removal station.
Figure 3E:
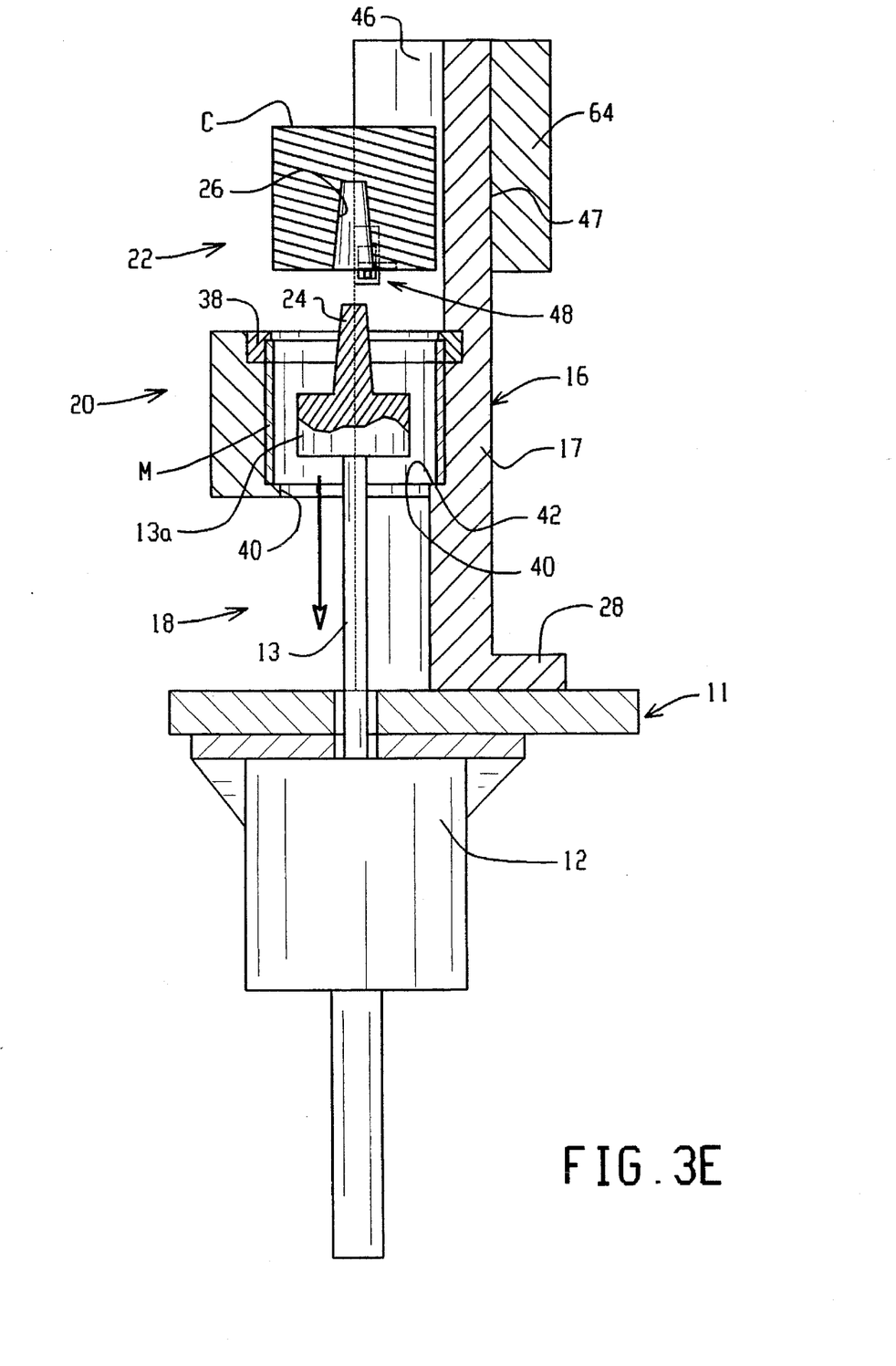
FIG. 3E is a schematic side view, partially cut-away, of the removal apparatus with the force rod member removed from engagement with the mold core portion and being retracted in a direction toward the clamping station.
Figure 3F:
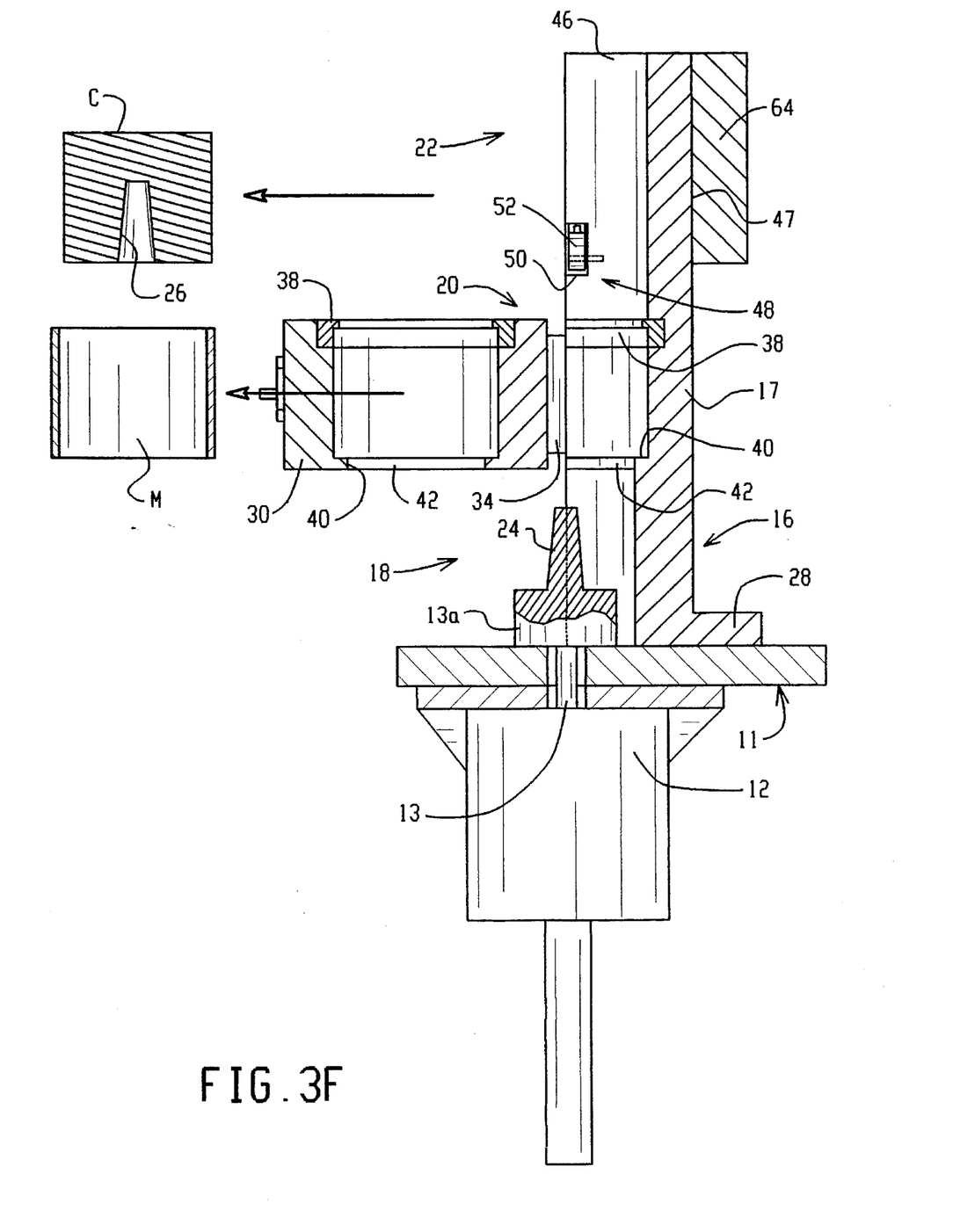
FIG. 3F is a schematic side view, partially cut-away, of the removal apparatus in the open position, with the molded part and mold core portion removed from the apparatus, and the force rod member fully retracted to the force rod member starting position.

In the locking door 30 open position shown FIGS. 3A and 3F, the locking door of the support member 16 is open to receive the mold core C engaged with the molded part M. Once engaged within a clamping groove 37 formed in the support member 16, the locking door 30 is moved to the closed position and locked in the closed position using the lock 36. A corresponding clamping groove 37' is formed in the locking door 30 for mating engagement with the molded part M. In this position, the molded part M containing the mold core C is clamped securely within the clamping station of the support member 30. The molded part M is secured in position engaged with and between upper 38 and lower 40 stop members. The stop members 38, 40 capture the molded part and engaged mold section. As illustrated, the upper stop members 38 are removable from the support member 16 and locking door 30. Since the molded part M is biased against the upper stop members 38 during the removal operation of the apparatus, the upper stop members may wear, and are removable for ease of and rapid replacement. Additionally, the upper stop members 38 may be removed and replaced with modified upper stop members to accommodate molded parts having different configurations.

The lower stop members 40 of the illustrated embodiment consist of a ledge 42 formed within the steel housing 17 of the support member 16. It should be understood that in the event a modified configuration of the molded part were used, additional removable insert lower stop members could be added, supported on the ledge 42 to accommodate the modified molded part.

As illustrated in the Figures, heating elements 44 are formed within longitudinal holes 55 of the steel housing 17 of the support member 16. Heating elements 44' are also provided within holes 55' in the door 30 of the clamping station. The heating elements 44 of the preferred embodiment are conventional cartridge-type resistance heating elements. The heating elements assist with any post-curing which may be needed to complete the molding of the molded part M. Such heating also assists with further heating of the mold core C prior to removal of the molded part. Additionally, the heating elements perform additional pre-heating of the mold core C once the part is removed and the mold core or molded part are moved to the removal station, in preparation for further injection molding procedures. An insulating member is provided adjacent the removal station portion of the steel housing 17, and is formed of material such as a thermal fiberglass media.

The removal station 22 of the support member 16 is positioned adjacent the clamping station 20. As shown in the Figures, the removal station 22 is positioned on a side of the clamping station 20 in the direction of the driver 12 travel. The removal station 22 includes a storage groove 46 which is formed within the steel housing 17 of the support member 30. Housed within the storage groove 46 are resistive members 48. As shown in FIGS. 1A and 3A, the resistive members are secured in part within housing openings 50 formed within the storage groove 46 of the removal station 22. The resistive members are preferably spring biased stripping dogs 52 having a spring engaged at the axle 54 where the dogs are supported in engagement with the housing openings 50. As the mold core is removed from the clamping station to the removal station by the driver, the stripping dogs maintain the mold core within the removal station as the driver is retracted to the initial station for further operations.

Figure 2:
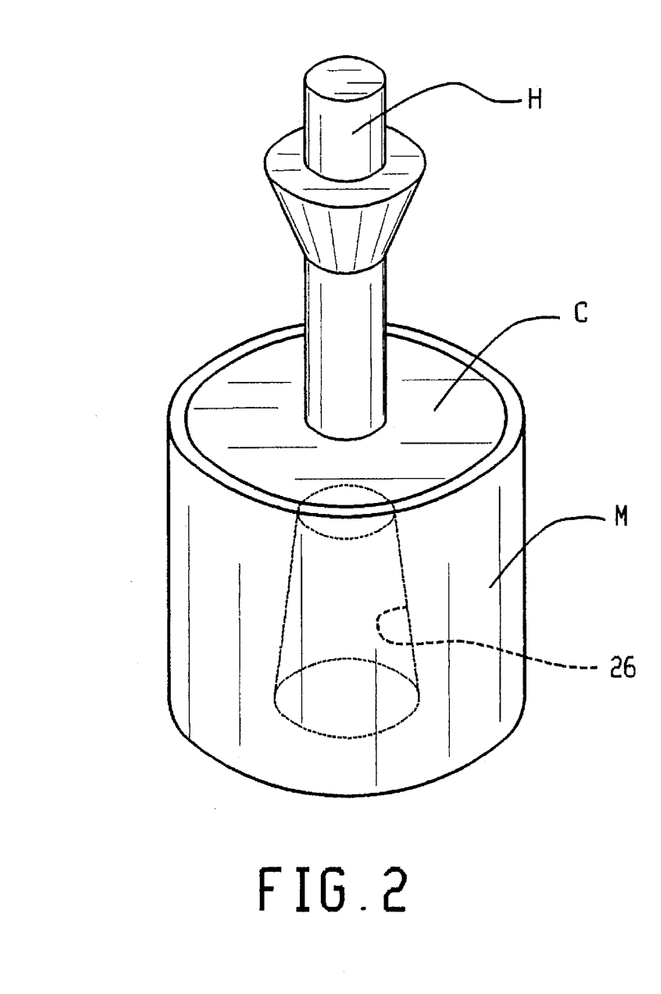
FIG. 2 is a perspective view of the molded part and mold core portion following transport from the molding apparatus and having a manual handle tool engaged with the mold core portion.

During operation of the removal apparatus 10, the driver 12 is first moved to the initial station 18. The molded part with the mold core are then positioned within the support member in open position. This may be accomplished manually using the handle H illustrated in FIG. 2, or by other installation mechanisms. The locking door 30 is then closed to clamp the molded part and mold core within the clamping grooves 37, 37' captured between the upper and lower stop members 38, 40. The piston force rod member 13 and cone shaped extension 24 of the engagement member 13a of the driver 12 are then moved to engage the cone shaped indent 26 within the mold core C. The driver continues to bias the piston force rod member 13 such that, in the illustrated embodiment, the mold core C is pushed out of engagement with the molded part M captured within the clamping station 20 to the removal station 22. As the mold core C is pushed through the upper stop members 38 into the removal station 22, the dogs 52 of the resistive members 48 are pivotally biased into their housing openings 50 to permit passage of the mold core. The preferred embodiment of the piston force rod member 13 is a screw which may bias the part from either the right hand or left hand direction.

While the mold core is removed from the captured molded part M in the illustrated embodiment, the element biased from the clamping station to the removal station may be either the molded part, the mold core or any other combination of elements.

Following movement of the mold core C to the removal station, the engagement member 13a of the piston force rod member 13 is retracted from engagement with the mold core. The mold core C is maintained within the removal station 22 as the engagement member 13a is removed, by the resistive members 48. Once the mold core C has passed through the resistive members 48, the dogs 52 are biased out of engagement within their housing openings 50 and into engagement with the mold core to resist movement of the mold core during removal of the engagement member 13a. The mold core C may then be removed from the removal station using the handle H or other removal mechanisms.

The locking door 30 is also then unlocked and moved from the closed position to the open position, such that the molded part M may be removed from the clamping groove 37. Once removal of the molded part and mold core are completed, a second molded part with a mold core may be reloaded to repeat the removal operation as described. The process of removing the mold core from the molded part is improved using the present apparatus by reducing the amount time taken for removal to approximately 10 seconds.

As shown in FIG. 1B, a control system 56 is also provided for automatically or manually controlling operation of the apparatus. The control system includes an operator actuator button 58 to initiate operation of the driver, speed control 60 and an emergency safety control 62 to enable the operator to shut off the apparatus during any stage of operation. Although not illustrated, it is understood that the control system could include a conventional programmable computer for programming the predetermined desired settings and operating conditions for operation of the apparatus.

The preferred form of the removal apparatus 10 has been described above. However, with the present disclosure in mind it is believed that obvious alterations to the preferred embodiment, to achieve comparable features and advantages in other assemblies, will become apparent to those of ordinary skill in the art.

We claim:

1. A removal apparatus for removing a mold section from a molded part comprising, a base frame supporting a driver and a power supply, said driver engaged with and driven by said power supply, and a support member engaged with the molded part, said support member having a clamping station which receives and clamps the mold section engaged with the molded part therein, said clamping station having an open position which receives the mold section engaged with the molded part therein, and a closed position in which the mold section and molded part are clamped within said clamping station, a removal station which receives the mold section following removal of the mold section, and a force rod member which engages the mold section, and is operated by said driver to move the force rod member between said clamping and removal stations during removal of the mold section from the molded part.

2. The removal apparatus as set forth in claim 1, wherein said removal station includes a resistive member which maintains the mold section within said removal station.

3. The removal apparatus as set forth in claim 2, wherein said resistive member is a spring biased member secured to said support member.

4. The removal apparatus as set forth in claim 2, wherein said clamping station includes a door movable between said open and closed positions, and a lock for securing said door in said closed position.

5. The removal apparatus as set forth in claim 4, wherein said clamping station further includes upper and lower stop members which capture the molded part and engaged mold section therein when said clamping station is in the closed position.

6. The removal apparatus as set forth in claim 5, wherein said upper stop members are removable from engagement with the clamping station.

7. The removal apparatus as set forth in claim 5, wherein said clamping station includes a heater which assists with partial curing of the molded part or partial heating of the mold section.

8. The removal apparatus as set forth in claim 6, wherein said removal station includes a heater which partially heats the molded part or mold section.

9. A removal apparatus for removing a mold section from a molded part comprising, a base frame supporting a driver and a power supply, said driver engaged with and driven by said power supply, and a support member for engagement with the molded part, said support member having a clamping station which receives and clamps the mold section engaged with the molded part therein, said clamping station having an open position which receives the mold section engaged with the molded part therein, and a closed position in which the mold section and molded part are clamped within said clamping station, and including a heater to assist with partial heating of the molded part and mold section prior to removal of the mold dection from the molded part, a removal station which receives the mold section following removal from engagement with the molded part, and a force rod member which engages the mold section, and is operated by said driver to move said force rod member between said clamping and removal stations during removal of the mold section from the molded part.

10. A removal apparatus for removing a mold section from a molded part comprising, a base frame supporting a driver and a power supply, said driver engaged with and driven by said power supply, and a support member engaged with the molded part, said support member having a clamping station which receives and clamps the mold section engaged with the molded part therein and a removal station which receives the mold section following removal from engagement with the molded part, said clamping station having an open position which receives the mold section engaged with the molded part therein, and a closed position in which the mold section and molded part are clamped within said clamping station, and including a heater to assist with partial heating of the molded part and mold section prior to removal of the mold section from the molded part, and a force rod member engaged with the mold section, and operated by said driver to move said force rod member between said clamping and removal stations during removal of the mold section from the molded part.

* * * * *